(12) United States Patent
Motowaki

(10) Patent No.: US 11,198,188 B2
(45) Date of Patent: Dec. 14, 2021

(54) SOLDERING DEVICE FOR SOLDERING WITH LASER BEAM AND ROBOT APPARATUS PROVIDED WITH SOLDERING DEVICE

(71) Applicant: Fanuc Corporation, Yamanashi (JP)

(72) Inventor: Yoshio Motowaki, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 70 days.

(21) Appl. No.: 16/843,374

(22) Filed: Apr. 8, 2020

(65) Prior Publication Data

US 2020/0376579 A1 Dec. 3, 2020

(30) Foreign Application Priority Data

May 29, 2019 (JP) .............................. JP2019-100500

(51) Int. Cl.
  *B23K 3/00* (2006.01)
  *B23K 1/005* (2006.01)
  *B23K 3/08* (2006.01)
  *B23K 3/06* (2006.01)

(52) U.S. Cl.
  CPC .......... *B23K 1/0056* (2013.01); *B23K 3/0607* (2013.01); *B23K 3/0653* (2013.01); *B23K 3/08* (2013.01)

(58) Field of Classification Search
  CPC ...... B23K 1/0056; B23K 3/08; B23K 3/0607; B23K 3/0653; B23K 1/20; B23K 2101/42; B25J 11/005
  USPC ................. 228/215, 256; 219/121.65, 121.66
  See application file for complete search history.

(56) References Cited

U.S. PATENT DOCUMENTS

| 4,899,924 | A | * | 2/1990 | Kawaguchi | .......... | B23K 1/0056 |
| | | | | | | 219/121.63 |
| 5,653,381 | A | * | 8/1997 | Azdasht | ................ | B23K 1/0056 |
| | | | | | | 228/14 |
| 10,061,084 | B1 | * | 8/2018 | Takayama | ................ | G02B 6/30 |
| 2002/0179696 | A1 | * | 12/2002 | Pattanaik | ............. | G11B 5/4853 |
| | | | | | | 228/246 |
| 2005/0051521 | A1 | * | 3/2005 | Shindo | ................. | H05K 3/3478 |
| | | | | | | 219/121.64 |
| 2005/0067395 | A1 | * | 3/2005 | Shindo | ................. | B23K 1/0056 |
| | | | | | | 219/121.85 |
| 2006/0065642 | A1 | * | 3/2006 | Shindo | ................. | B23K 1/0056 |
| | | | | | | 219/121.63 |
| 2006/0219760 | A1 | * | 10/2006 | Wagoh | ................. | H05K 3/3478 |
| | | | | | | 228/248.1 |

(Continued)

FOREIGN PATENT DOCUMENTS

| JP | 63036969 | A | * | 2/1988 | .......... | B23K 1/0056 |
| JP | 08008284 | A | | 1/1996 | | |

(Continued)

*Primary Examiner* — Kiley S Stoner
(74) *Attorney, Agent, or Firm* — RatnerPrestia

(57) ABSTRACT

A soldering device includes a laser head for outputting a laser beam and a solder feeder for feeding a thread solder to a path of the laser beam. The soldering device includes a solder receiving member for receiving solder melted by the laser beam and a pouring member for pouring molten solder into a workpiece. The solder receiving member includes a recess part having a shape for retaining the molten solder. The pouring member has a groove part communicating with the recess part and allowing the solder to flow therein.

8 Claims, 12 Drawing Sheets

(56) References Cited

U.S. PATENT DOCUMENTS

| | | | | |
|---|---|---|---|---|
| 2007/0075056 A1* | 4/2007 | Ho | G11B 5/4846 | 219/121.66 |
| 2007/0228021 A1* | 10/2007 | Wagou | B23K 1/0056 | 219/121.63 |
| 2008/0179298 A1* | 7/2008 | Nakayama | B23K 1/0056 | 219/85.13 |
| 2008/0179299 A1* | 7/2008 | Fukaya | B23K 1/0056 | 219/121.63 |
| 2009/0001054 A1* | 1/2009 | Mizuno | H05K 3/3478 | 219/78.13 |
| 2009/0294412 A1* | 12/2009 | Kono | B23K 26/032 | 219/121.6 |
| 2009/0321394 A1* | 12/2009 | Matsushita | B23K 3/0638 | 219/121.64 |
| 2010/0051589 A1* | 3/2010 | Azdasht | B23K 3/0623 | 219/72 |
| 2010/0089981 A1* | 4/2010 | Matsumoto | H05K 3/3478 | 228/245 |
| 2011/0020666 A1* | 1/2011 | Wakisaka | B23K 35/28 | 428/650 |
| 2013/0256277 A1* | 10/2013 | Li | B23K 26/14 | 219/74 |
| 2013/0256281 A1* | 10/2013 | Tsuchiya | G11B 5/4853 | 219/121.64 |
| 2016/0121416 A1* | 5/2016 | Murata | B23K 3/0623 | 228/248.1 |
| 2016/0279725 A1* | 9/2016 | Azdasht | B23K 26/354 | |
| 2016/0346858 A1* | 12/2016 | Shen | B23K 26/009 | |
| 2017/0197269 A1* | 7/2017 | Matsumoto | B23K 3/063 | |
| 2018/0147646 A1* | 5/2018 | Collins | H01R 43/0221 | |
| 2021/0138584 A1* | 5/2021 | Viano | B23K 1/0056 | |

FOREIGN PATENT DOCUMENTS

| | | |
|---|---|---|
| JP | 2010089159 A | 4/2010 |
| JP | 2011216503 A | 10/2011 |
| WO | WO-2018192646 A1 * 10/2018 | B23K 3/08 |

* cited by examiner

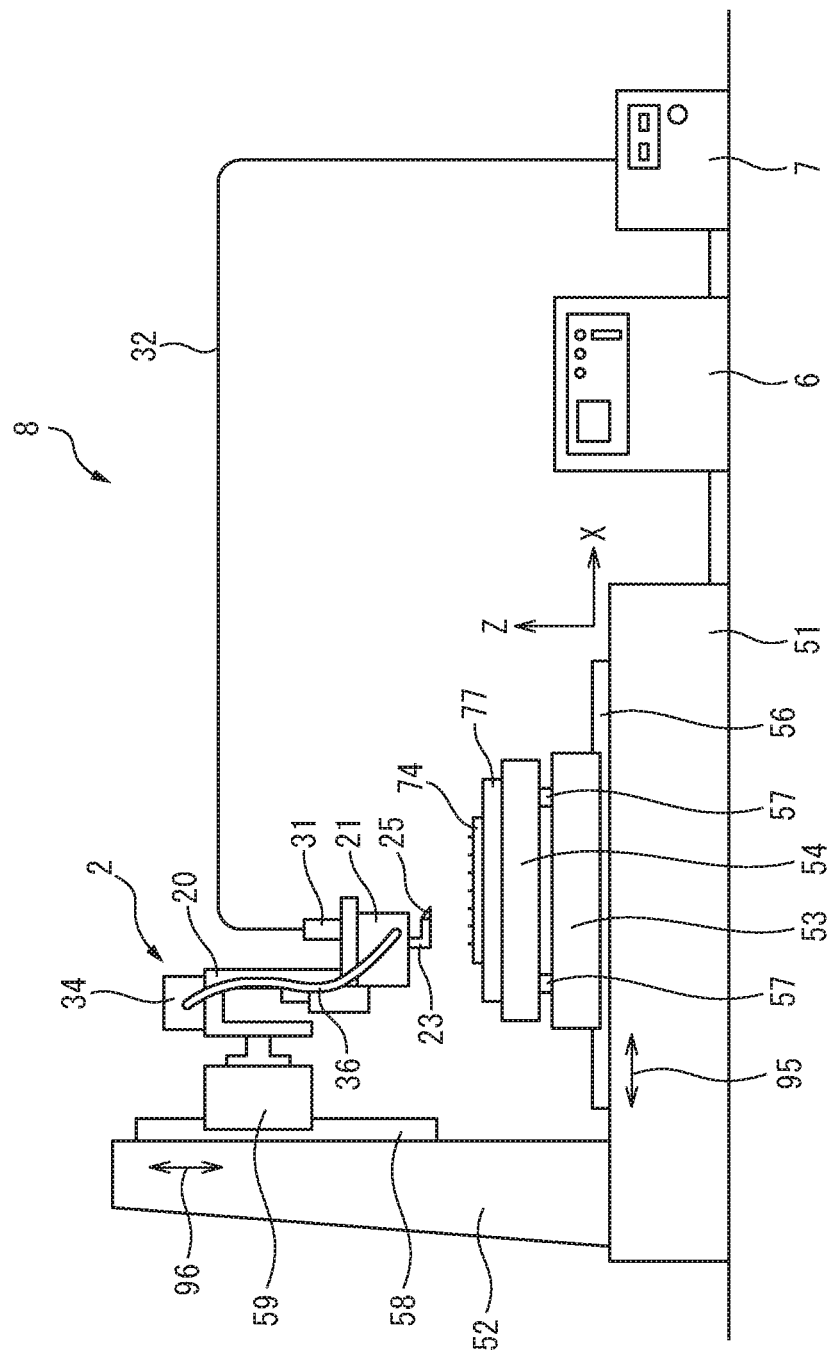

SOLDERING DEVICE FOR SOLDERING WITH LASER BEAM AND ROBOT APPARATUS PROVIDED WITH SOLDERING DEVICE

CROSS-REFERENCE TO RELATED APPLICATIONS

This application is a new U.S. Patent Application that claims benefit of Japanese Patent Application No. 2019-100500, dated May 29, 2019, the disclosure of this application is being incorporated herein by reference in its entirety for all purposes.

BACKGROUND OF THE INVENTION

1. Field of the Invention

The present invention relates to a soldering device for soldering with a laser beam and a robot apparatus provided with the soldering device.

2. Description of the Related Art

Parts are fixed to each other and electrically connected to an electric circuit by soldering operation. For example, soldering can be performed when an electronic part is fixed to a board such as a printed circuit board. By performing soldering, an electronic part can be fixed to a board and the electronic part can be connected to an electric circuit formed on the board. In the case of soldering, solder is heated to melt. The molten solder is fed to portions for fixing the electronic parts, for example, the leads or terminals of the electronic parts. Thereafter, the solder hardens as the solder decreases in temperature.

In the related art, it is known that a laser beam is irradiated to solder in order to heat and melt the solder (for example, Japanese Unexamined Patent Publication No. 2011-216503, Japanese Unexamined Patent Publication No. 2010-89159, and Japanese Unexamined Patent Publication No. 8-8284). By using the laser beam for melting the solder, the solder can be melted in a short time, whereby an operation time for soldering can be shorten.

SUMMARY OF THE INVENTION

In a soldering device for melting solder with a laser beam, the solder is placed on the portion of the lead of DIP (Dual Inline Package) part or the terminal of surface-mount part before the solder is melted. A laser beam is then irradiated to the solder, so that the solder is melted and fed to the portion at which the lead or the terminal is arranged.

In a soldering operation, for example, the leads of electronic part are inserted into through holes formed on a printed circuit board. Subsequently, the solder is placed on the portions at which the leads are arranged from the back side of the printed circuit board. The solder is melted by irradiation of the laser beam so as to fix the leads arranged in the through holes onto the board.

In such a soldering operation, a laser beam may be reflected on the surface of the lead of the electronic part. The reflected laser beam may reach a portion around the through hole of the printed circuit board. For example, a laser beam may be reflected on the end of the lead and burn a portion around the through hole of the printed circuit board. Alternatively, a laser beam may be reflected on the tip of the lead and reach an electronic part disposed around an electronic part to be soldered. Thus, the electronic part may be burned by the laser beam.

The tips of the leads of the electronic parts may have various shapes, especially if the leads of the electronic parts do not have cylindrical shapes. For example, the leads may have shape like plate and the electronic part may be temporarily fixed in the through hole by the elasticity of the lead. A laser beam is reflected in various directions by the end part of the lead and thus may burn the printed circuit board or surrounding electronic part.

Alternatively, a laser beam may pass through the printed circuit board from a gap between the lead and the through hole and reach the main body of the electronic part. Thus, the laser beam may be irradiated to a mold covering an element and burn the main body. In particular, when the lead has a shape other than cylindrical shape, there is a large space between the lead and the through hole, and thus a laser beam easily reaches the main body of the electronic part.

The reliability of some electronic parts may decrease with increase in temperature. When the solder is melted by a laser beam, the electronic part may instantly rise in temperature, depending on the output of the laser beam, and the reliability of the electronic part may be reduced.

As described above, when the soldering operation is performed with a laser beam, the quality of the printed circuit board may be deteriorated. For example, also in an electric circuit operating normally during manufacturing, the printed circuit board or the electronic part may be burned and thereby reduce durability. Especially in the case of a device such as a machine controller that needs to operate normally over an extended period, there is the problem that the printed circuit board and the electronic part may be burned during the manufacturing of the printed circuit board.

A designer of a printed circuit board designs the printed circuit board so as to prevent damage to the printed circuit board or electronic parts during soldering with a laser beam. For example, a printed circuit board is designed with a small-diameter through hole so as to prevent a laser beam from passing through the through hole. However, when the through hole having small diameter is employed, the failure in insertion is liable to occur in an operation for inserting the lead of electronic part through the through hole. Alternatively, when the electronic part having low heat resistance is used, the range in which heat generated by the laser beam spreads is examined in the design of the printed circuit board. Moreover, an element arranged in the electronic part may be damaged by the irradiation of the laser beam. Thus, electronic parts having heat resistance are selected. Furthermore, an appropriate layout of the electronic parts is determined.

As described above, in the case of soldering with a laser beam, a special workpiece design is necessary in order to suppress damage to the workpiece such as a printed circuit board or damage to parts fixed to the workpiece. Hence, there is the problem that a considerable effort is required of the designer in a design of the workpiece.

A soldering device according to an aspect of the present disclosure feeds solder melted by a laser beam to a workpiece. The soldering device includes a laser beam emitting member for outputting a laser beam and a solder feeder for feeding the solder to the path of the laser beam. The soldering device includes a solder receiving member for receiving the solder melted by the laser beam and a pouring member for pouring molten solder into the workpiece. The solder receiving member includes a reception part having a shape for retaining the molten solder. The pouring member is fixed to the solder receiving member and has a solder channel communicating with the reception part and allowing the solder to flow therein.

A robot apparatus according to the aspect of the present disclosure includes the above soldering device and an articulated robot for changing the position and orientation of the soldering device. The robot apparatus includes a controller for controlling the articulated robot. The controller performs control in which the soldering device is tilted so as to feed the molten solder from the reception part to the workpiece through the solder channel. The controller performs control in which the laser beam is irradiated so as to feed the solder to the workpiece while the soldering device is tilted.

BRIEF DESCRIPTION OF THE DRAWINGS

FIG. 13 is a schematic side view of a soldering system according to the embodiment.

DETAILED DESCRIPTION

Referring to FIGS. 1 to 13, a soldering device and a robot apparatus provided with the soldering device according to an embodiment will be described below. The soldering device of the present embodiment melts solder with layer light and feeds molten solder to a workpiece.

Figure 1:
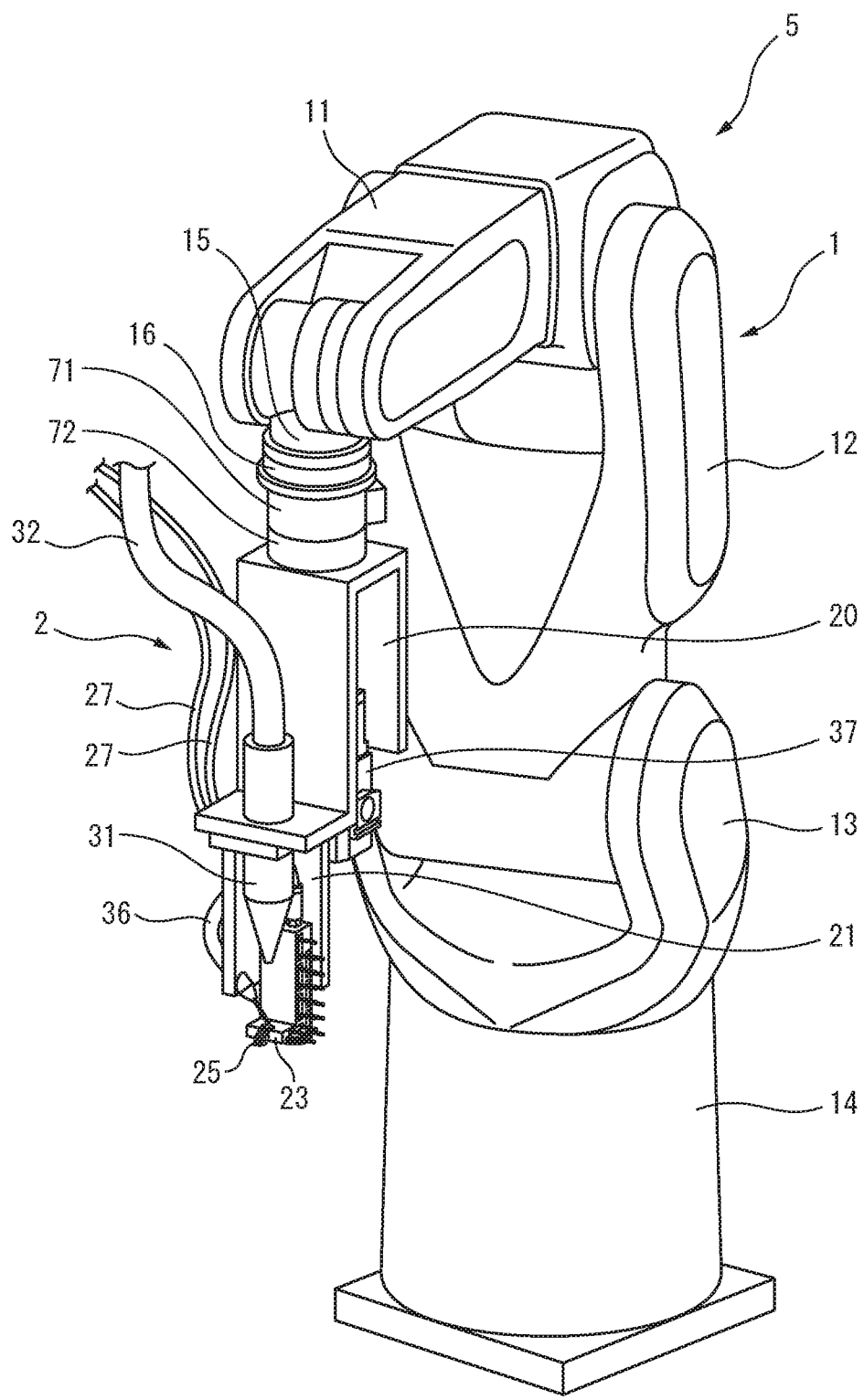
FIG. 1 is a perspective view of a robot apparatus according to an embodiment.

FIG. 1 is a schematic perspective view of the robot apparatus according to the present embodiment. A robot apparatus 5 includes an operation tool and a robot 1 that moves the operation tool. The operation tool of the present embodiment is a soldering device 2. The soldering device 2 is connected to the robot 1. The robot apparatus 5 changes the position and orientation of the soldering device 2 and feeds molten solder to a predetermined position of the workpiece.

The robot 1 of the present embodiment is an articulated robot including a plurality of joints. The robot 1 includes a base part 14 and a rotation base 13 supported by the base part 14. The base part 14 is fixed to an installation surface. The rotation base 13 is formed so as to rotate relative to the base part 14. The robot 1 includes an upper arm 11 and a lower arm 12. The lower arm 12 is pivotally supported by the rotation base 13 via the joint. The upper arm 11 is pivotally supported by the lower arm 12 via the joint. The upper arm 11 rotates about a rotary axis parallel to a direction along with the upper arm 11 extends.

The robot 1 includes a wrist 15 connected to one end of the upper arm 11. The wrist 15 is pivotally supported by the upper arm 11 via the joint. The wrist 15 includes a flange 16 that is formed to be rotatable. The robot 1 of the present embodiment includes six drive axes, but the embodiment is not limited to this. Any robot capable of changing the position and orientation of the soldering device 2 may be used.

The robot apparatus 5 of the present embodiment has an automatic tool changer (ATC) that can automatically change the operation tool. The automatic tool changer includes a robot-side plate 71 attached to the flange 16 of the robot 1 and a tool-side plate 72 attached to the soldering device 2. The tool-side plate 72 is formed so as to be connected and released to and from the robot-side plate 71. The robot apparatus 5 can automatically change the operation tool. The soldering device 2 may be fixed to the flange 16 without the automatic tool changer.

Figure 2:
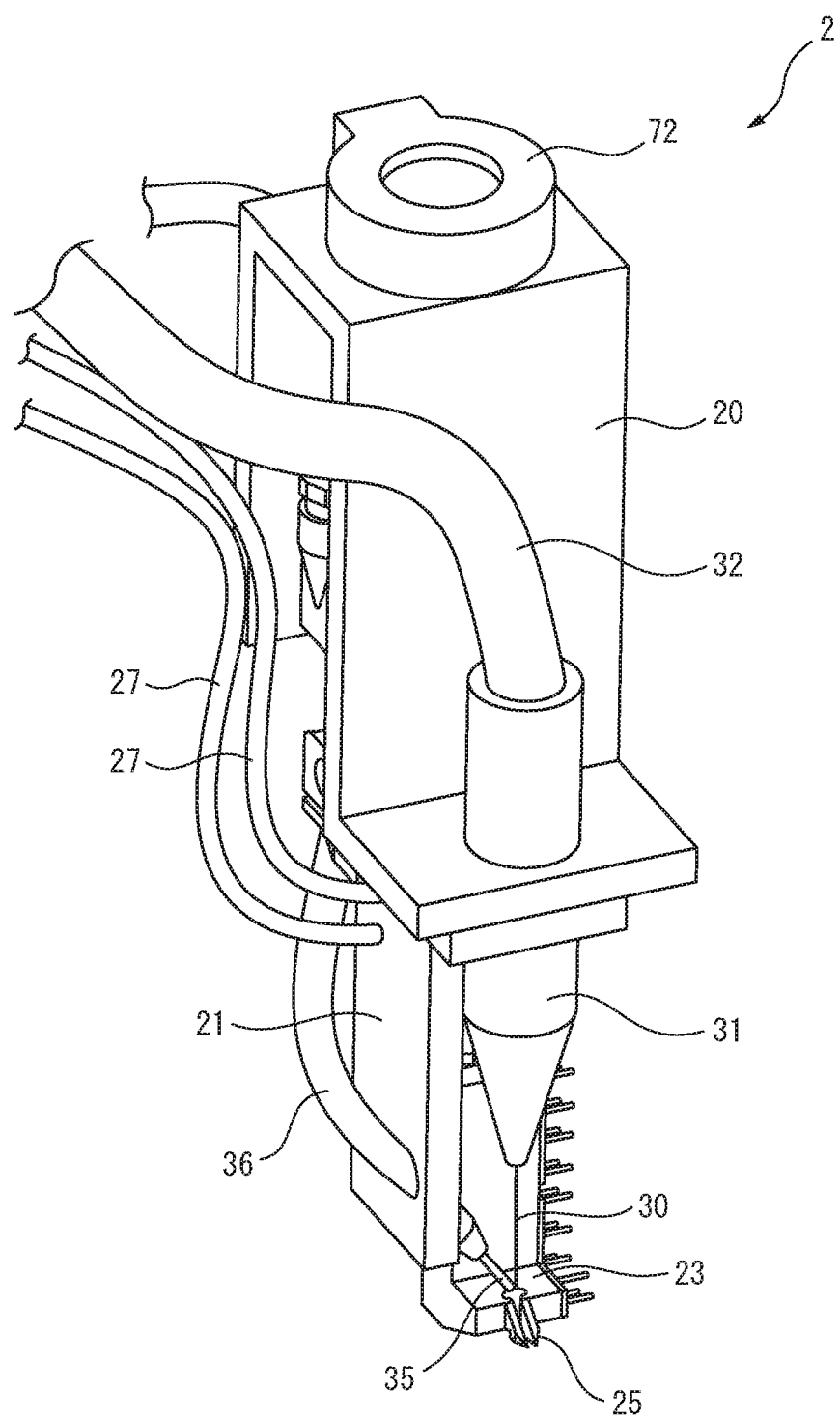
FIG. 2 is a perspective view of a principal part of a soldering device viewed from the side of a laser head according to the embodiment.
Figure 3:
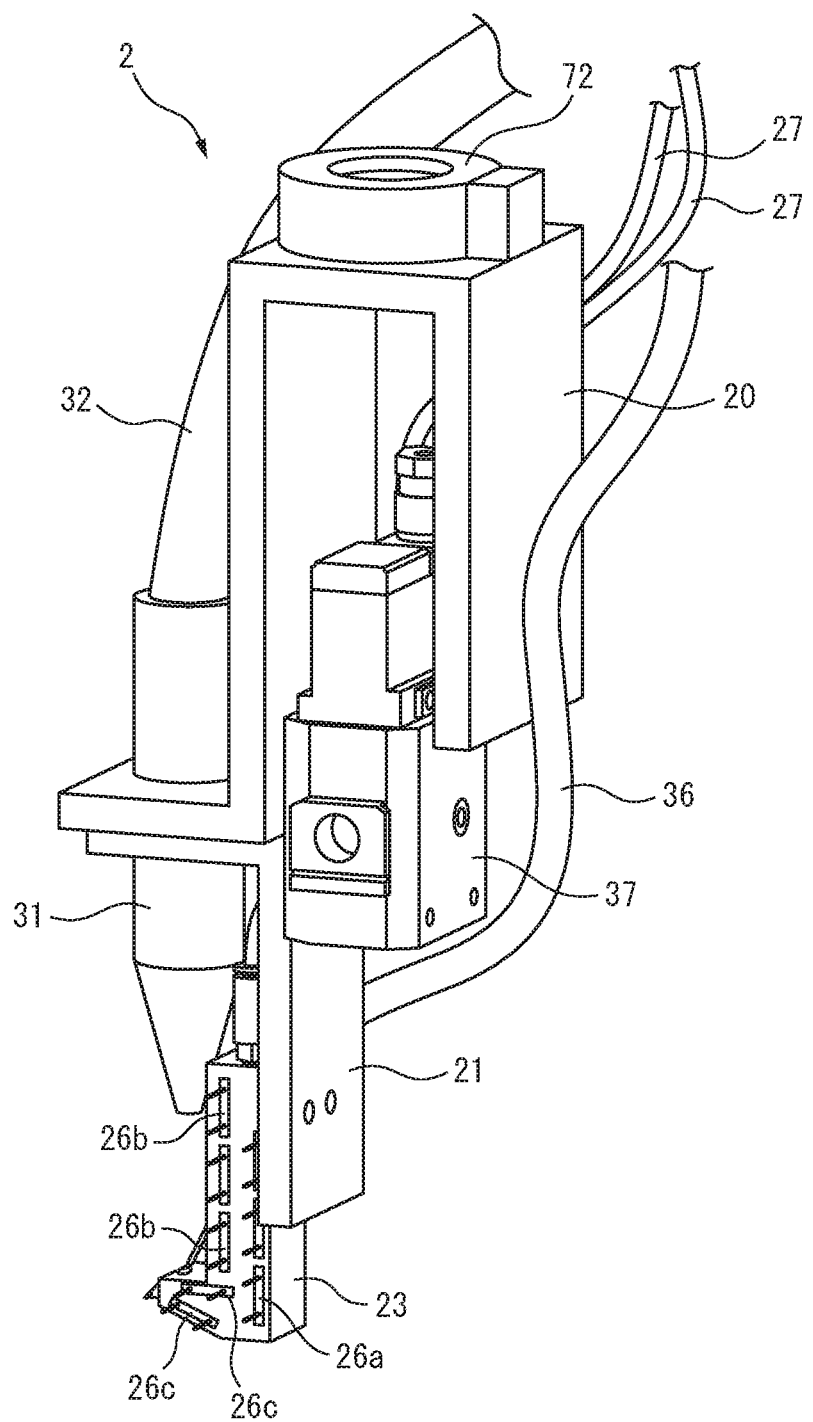
FIG. 3 is a perspective view of the principal part of the soldering device viewed from the side of a vibrator.

FIG. 2 is a perspective view of the soldering device viewed from one side according to the present embodiment. FIG. 3 is a perspective view of the soldering device viewed from the other side according to the present embodiment. Referring to FIGS. 2 and 3, the soldering device 2 includes a support member 20 fixed to the tool-side plate 72 of the automatic tool changer and a heat insulation member 21 fixed to the support member 20. The heat insulation member 21 can be formed as a member having low thermal conductivity. For example, the heat insulation member 21 can be made of materials such as zirconia and steatite that are fine ceramics having excellent heat insulating properties.

The soldering device 2 includes a laser head 31 acting as a laser beam emitting member for outputting a laser beam. The laser head 31 is supported by the support member 20 and the heat insulation member 21. To the laser head 31 of the present embodiment, a laser beam 30 is supplied through an optical fiber 32. The soldering device 2 includes a solder feeder 34 for feeding the solder to the path of the laser beam 30. The solder feeder 34 of the present embodiment feeds a thread solder 35. The solder feeder 34 includes a delivery machine for feeding the thread solder 35 and a solder feed pipe 36 for guiding the thread solder 35 to a predetermined position. The delivery machine has a mechanism of a roller or the like and feeds the thread solder 35 into the solder feed pipe 36. The delivery machine is attached to, for example, the robot 1. The solder feed pipe 36 is fixed to the heat insulation member 21. The thread solder 35 projects out of the tip of the solder feed pipe 36. The laser beam 30 is irradiated from the laser head 31 to the thread solder 35 fed from the solder feed pipe 36.

The solder feeder 34 of the present embodiment feeds the thread solder. The configuration is not limited to this embodiment. The solder feeder can feed solder in any form. For example, the solder feeder may feed solder paste or solder balls. The solder feeder can feed solder paste or solder balls to the path of the laser beam.

Figure 4:
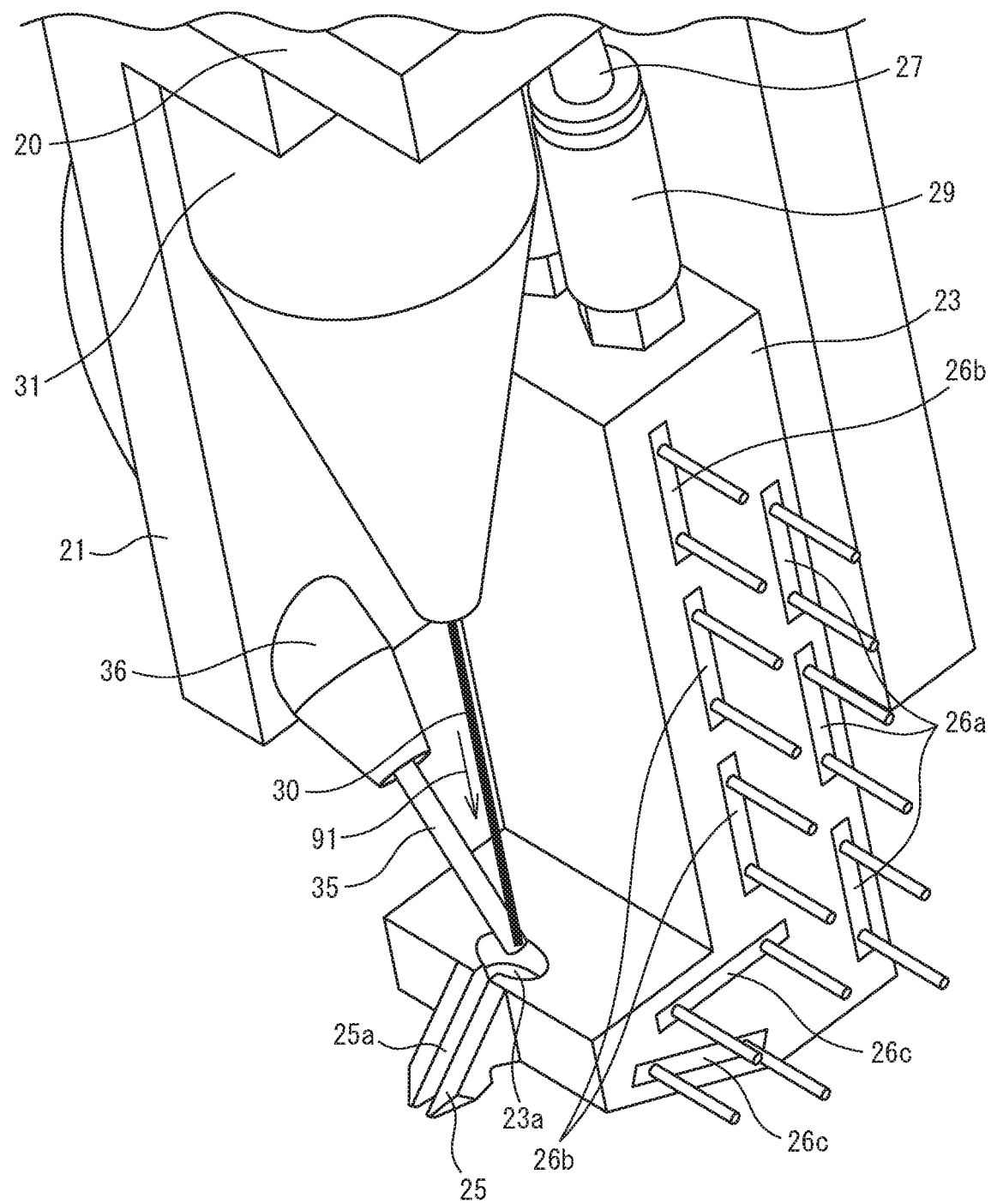
FIG. 4 is an enlarged perspective view of a part for melting solder in the soldering device.

FIG. 4 is an enlarged perspective view of a part where a laser beam is irradiated to the thread solder. Referring to FIGS. 2 to 4, the soldering device 2 includes a solder receiving member 23 for receiving solder melted by the laser beam 30. The solder receiving member 23 is fixed to the heat insulation member 21. The solder receiving member 23 is made of heat-resistant material. Furthermore, the solder receiving member 23 can be made of material having high thermal conductivity. For example, the solder receiving member 23 can be made of material such as silicon carbide or aluminum nitride that are fine ceramics having excellent thermal conductivity.

The solder receiving member 23 includes a recess part 23a serving as a reception part to which the solder melted by the laser beam 30 drops. The reception part is shaped to retain the molten solder. The reception part in which the solder drops is not limited to the recess part, but may have any shape as long as liquid solder is temporarily retained. For example, a wall may be formed around the region in which the solder drops so as to intercept the molten solder.

The solder receiving member 23 of the present embodiment is L-shaped in side view. A part of the solder receiving member 23 is arranged on the path of the laser beam 30. When viewed from the laser head 31, the solder receiving member 23 is disposed behind the thread solder 35. If the solder feeder 34 does not feed the thread solder 35, the laser beam 30 reaches the solder receiving member 23. In the present embodiment, if the solder feeder 34 does not feed the thread solder 35, the laser beam 30 reaches the recess part 23a.

The soldering device 2 includes a pouring member 25 for pouring the solder received in the solder receiving member 23 into a workpiece. The pouring member 25 can be made of the same material as the solder receiving member 23. The pouring member 25 is fixed to the solder receiving member 23. The pouring member 25 has a groove part 25a that communicates with the recess part 23a of the solder receiving member 23 and serves as a solder channel that allows the molten solder to flow therein.

In the present embodiment, the groove part of the pouring member is formed as a solder channel. The configuration is not limited to this embodiment. The solder channel may have any configuration in which the molten solder flows. For example, the pouring member may be formed by a pipe and formed so that the solder flows in the pipe.

Figure 5:
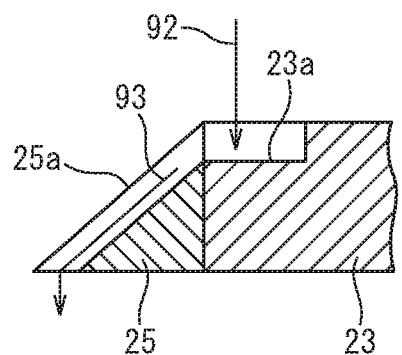
FIG. 5 is an enlarged cross-sectional view of the recess part of a solder receiving member and the groove part of a pouring member.

FIG. 5 is an enlarged cross-sectional view of the recess part of the solder receiving member and the groove part of the pouring member according to the present embodiment. The bottom surface of the groove part 25a is tilted relative to the bottom surface of the recess part 23a. In the present embodiment, the bottom surface of the recess part 23a is formed at the same height as the end of the bottom surface of the groove part 25a. In other words, any step is not formed at the boundary part between the bottom surface of the recess part 23a and the bottom surface of the groove part 25a.

Referring to FIGS. 4 and 5, when the solder feeder 34 is driven, the thread solder 35 projects out of the tip of the solder feed pipe 36. As indicated by an arrow 91, the thread solder 35 is melted by the irradiation of the laser beam 30. The thread solder 35 is fed by the solder feeder 34 while being melted. The thread solder 35 is melted above the recess part 23a. The molten solder drops into the recess part 23a as indicated by an arrow 92. Thereafter, as indicated by an arrow 93, the molten solder passes through the groove part 25a of the pouring member 25 and then drops from the tip of the groove part 25a. The tip of the groove part 25a is placed above a part to be soldered, thereby feeding the molten solder to the part to be soldered.

In this way, the solder dropped into the recess part 23a immediately passes through the groove part 25a and is fed to the workpiece. The soldering device 2 of the present embodiment feeds the molten solder to the workpiece in a short time, thereby suppressing oxidation of the solder.

Figure 6:
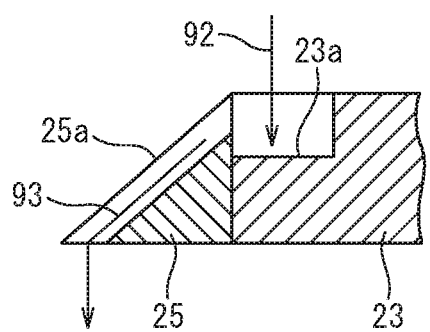
FIG. 6 is an enlarged cross-sectional view of the recess part of the solder receiving member and the groove part of the pouring member according to another embodiment.

FIG. 6 is an enlarged cross-sectional view of the recess part of the solder receiving member and the groove part of the pouring member according to a modification. In the example of FIG. 5, any step is not formed at the boundary between the bottom surface of the recess part 23a and the bottom surface of the groove part 25a. The configuration is not limited to this embodiment. A step may be formed at the boundary between the bottom surface of the recess part 23a and the bottom surface of the groove part 25a. In the example of FIG. 6, the recess part 23a is formed deeper than the bottom surface of the end of the groove part 25a. A step is formed at the boundary between the bottom surface of the recess part 23a and the bottom surface of the groove part 25a. Also in this case, the solder melted by a laser beam drops into the recess part 23a as indicated by the arrow 92. The solder then passes through the groove part 25a as indicated by the arrow 93. Thereafter, the solder is fed to the workpiece from the tip of the groove part 25a.

Figure 7:
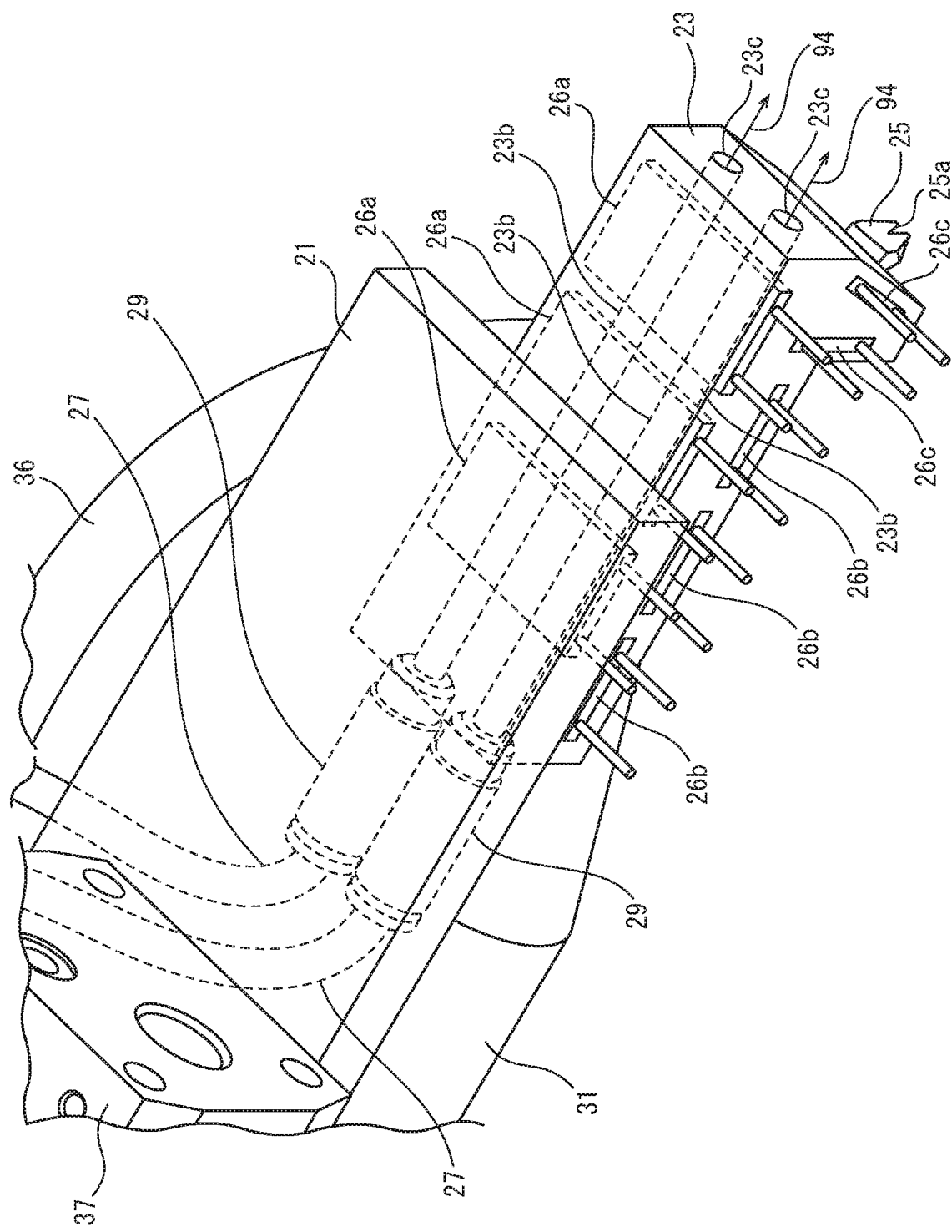
FIG. 7 is an enlarged perspective view of the principal part of the soldering device for illustrating holes formed in the solder receiving member and heaters mounted in the solder receiving member.

FIG. 7 is an enlarged perspective view of the soldering device viewed from the side opposite to the side on which the laser head is arranged according to the present embodiment. Referring to FIGS. 3, 4, and 7, the soldering device 2 of the present embodiment includes heaters 26a, 26b, and 26c mounted in the solder receiving member 23. The heaters 26a, 26b, and 26c of the present embodiment are plate-like micro ceramic heaters. The heaters 26a, 26b, and 26c are embedded in the solder receiving member 23.

The heaters 26a, 26b, and 26c are formed so as to keep the temperatures of the solder receiving member 23 and the pouring member 25 higher than the melting point of used solder. The solder receiving member 23 and the pouring member 25 are kept at high temperatures by driving the heaters 26a, 26b, and 26c. The heaters 26a, 26b, and 26c of the present embodiment can keep the temperatures of the solder receiving member 23 and the pouring member 25 within a temperature range according to the melting point of the solder. The melting point of lead-free solder is, for example, about 220° C. In this case, the heaters 26a, 26b, and 26c can keep the temperatures of the solder receiving member 23 and the pouring member 25 in the range of 250° C. to 350° C. In the case of eutectic solder, the melting point is, for example, about 180° C. In this case, the heaters 26a, 26b, and 26c can keep the temperatures of the solder receiving member 23 and the pouring member 25 in the range of 220° C. to 280° C.

The heaters 26a, 26b, and 26c in the solder receiving member 23 can suppress decrease in temperature of the solder when the solder passes through the recess part 23a and the groove part 25a. The solder can be suppressed from hardening before the solder is fed to a workpiece. The heaters 26c of the present embodiment, in particular, are disposed near a part where the recess part 23a is formed and the pouring member 25. Thus, the recess part 23a and the pouring member 25 can be kept effectively at high temperatures. Note that the solder receiving member may not include the heaters. In this case, the solder receiving member can be heated in advance by a heating device that is different from the soldering device. For example, the solder receiving member can be heated by the heating device each time the solder is fed.

In the soldering device 2 of the present embodiment, the laser beam 30 is outputted toward the solder receiving member 23. The solder receiving member 23 is disposed behind the solder when viewed from the laser head 31. This configuration can suppress the reflection of a laser beam from a workpiece or a part mounted on the workpiece, reducing burning of the workpiece, the part mounted on the workpiece, or a part fixed to the workpiece. The soldering device of the present embodiment can suppress damage caused by a laser beam to a workpiece or a part fixed to the workpiece.

The soldering device 2 of the present embodiment is formed so as to eject high temperature air to a workpiece. The soldering device 2 includes an air feeder 28 that feeds air to the solder receiving member 23. The air feeder 28 of the present embodiment includes a compressor for compressing air, air feed pipes 27 for feeding air, and connection members 29 connecting the air feed pipes 27 to the solder receiving member 23. The compressor for compressing air is attached to, for example, the robot 1.

The solder receiving member 23 has holes 23b that serve as air passages. The holes 23b are formed in the solder receiving member 23 and are connected to the air feeder 28. The solder receiving member 23 has an exhaust port 23c formed on one end of the hole 23b. The hole 23b of the present embodiment extends from one end face to the other end face in the longitudinal direction of the solder receiving member 23. The air feed pipe 27 is connected to the hole 23b via the connection member 29.

A plurality of the heaters 26a are placed in a line along the longitudinal direction of the solder receiving member 23. A plurality of the heaters 26b are also placed in a line along the longitudinal direction of the solder receiving member 23. The holes 23b are formed in a region between the line of the heaters 26a and the line of the heaters 26b.

The air feeder 28 feeds compressed air into the air feed pipes 27. The air fed into the air feed pipes 27 is heated through the holes 23b. The heated air is ejected from the exhaust ports 23c as indicated by arrows 94. The soldering device 2 of the present embodiment can preheat a workpiece with high temperature air ejected from the holes 23b. The soldering device 2 is disposed with the exhaust ports 23c opposed to a part to be soldered, so that a workpiece can be preheated.

In the solder receiving member 23 of the present embodiment, the holes 23b are formed in a region between the line of the heaters 26a and the line of the heaters 26b, thereby efficiently heating air. The hole 23b of the present embodiment has a linear shape, but the embodiment is not limited to this. The air passage may have a curved portion. By adopting this configuration, the passage for heating air is extended so as to more effectively heat air.

In the soldering operation, a preheat operation in which a part to be soldered is heated is performed before the molten solder is fed. By performing the preheat operation, solder wettability is improved, thereby properly spreading the solder. In the device for soldering with a laser beam, a part to be soldered can be preheated by irradiating the laser beam directly. However, when a part having a large thermal capacity is soldered, a high-power laser oscillator is necessary. As opposed to this, the soldering device 2 of the present embodiment can extend a time for spraying high temperature air when a part having a larger thermal capacity is soldered. By adopting this control, the preheat operation of the workpiece can be performed easily. The need for the laser oscillator for oscillating a high-power laser beam is eliminated, so that the soldering device can have a simple configuration.

The heaters 26a, 26b, and 26c of the present embodiment are embedded in the solder receiving member 23, but the configuration is not limited to this embodiment. The solder receiving member can be heated by any heaters. For example, hot wires for heating the solder receiving member may be wound around the solder receiving member.

Referring to FIG. 3, the soldering device 2 of the present embodiment includes a vibrator 37 that vibrates the solder receiving member 23. The vibrator 37 of the present embodiment is fixed to the support member 20. The vibrator 37 may be any mechanism for generating vibration. For example, the vibrator 37 has a structure including an eccentric weight attached to the output shaft of a motor. The vibrator 37 can generate vibrations by rotating the eccentric weight.

The vibrator 37 has the function of vibrating the solder receiving member 23 and the pouring member 25 when the molten solder is fed. The molten metal is viscous and thus may not smoothly flow from the recess part 23a along the groove part 25a of the pouring member 25. When the solder is fed, the solder receiving member 23 and the pouring member 25 are vibrated so that the solder flows smoothly. Note that the vibrator 37 may not be disposed.

Figure 8:
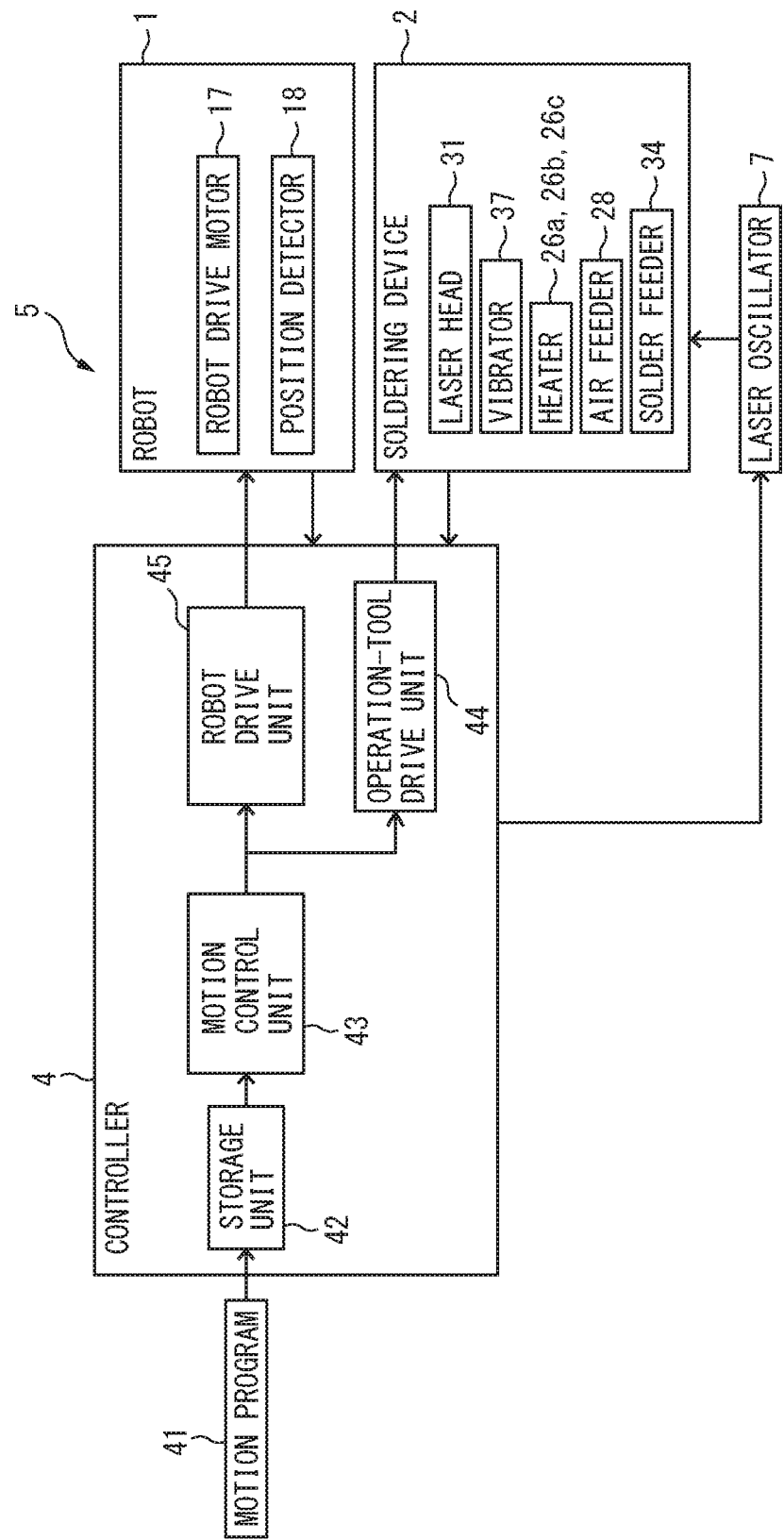
FIG. 8 is a block diagram of the robot apparatus according to the embodiment.

FIG. 8 is a block diagram of the robot apparatus according to the present embodiment. Referring to FIGS. 1 to 3 and 8, the robot 1 includes a robot drive device that changes the position and posture of the robot 1. The robot drive device includes a plurality of robot drive motors 17 that drive components such as an arm and a wrist. The robot drive motors 17 are disposed for the respective components. By driving the robot drive motors 17, the orientations of the respective components are changed.

The robot apparatus 5 includes a controller 4 that controls the robot apparatus 5. The controller 4 includes an arithmetic processing device (computer) having a CPU (Central Processing Unit) as a processor. The arithmetic processing device includes RAM (Random Access Memory), ROM (Read Only Memory), and the like that are connected to the CPU via a bus. A motion program 41 for controlling the robot 1 and the soldering device 2 is inputted to the controller 4. Alternatively, the controller 4 generates the motion program 41 according to a teaching operation by an operator.

The controller 4 includes a storage unit 42 that stores information on the control of the robot apparatus 5. The storage unit 42 may include a storage medium capable of storing information, such as a volatile memory, nonvolatile memory, or a hard disk. A processor acting as a motion control unit 43 is formed so as to read information stored in the storage unit 42. The motion program 41 is stored in the storage unit 42. The controller 4 of the present embodiment controls the robot 1 and the soldering device 2 based on the motion program 41.

The command controller 4 includes the motion control unit 43 that transmits a motion command. The motion control unit 43 is equivalent to the processor driven according to the motion program 41. The processor reads the motion program 41 and performs control as defined in the motion program 41, so that the processor acts as the motion control unit 43. The motion control unit 43 transmits a motion command for driving the robot 1, based on the motion program 41, to a robot drive unit 45. The robot drive unit 45 includes an electric circuit that drives the robot drive motor 17. The robot drive unit 45 supplies electricity to the robot drive motors 17, based on the motion command.

The robot 1 includes a status detector that detects the position and posture of the robot 1. The status detector of the present embodiment includes position detector 18 that is attached to the robot drive motor 17. The controller 4 detects the position and posture of the robot 1, based on the outputs of the position detectors 18.

The motion control unit 43 transmits a motion command for driving the soldering device 2, based on the motion program 41, to an operation-tool drive unit 44. The operation-tool drive unit 44 includes an electric circuit that drives the drive device of the soldering device 2. The operation-tool drive unit 44 supplies electricity to the controller of the laser head 31, the vibrator 37, and the heaters 26*a*, 26*b*, and 26*c* based on the motion command. The operation-tool drive unit 44 also supplies electricity to the air feeder 28 and the solder feeder 34 based on the motion command.

The robot apparatus 5 includes a laser oscillator 7 that oscillates a laser beam. The laser oscillator 7 includes a laser controller that controls the oscillation of a laser beam. The laser controller is formed so as to communicate with the controller 4. The laser controller includes an arithmetic processing device (computer) including a CPU as a processor and RAM. The motion control unit 43 transmits a command for outputting a laser beam, to the laser controller. The laser controller oscillates a laser beam based on the motion command. The laser oscillator 7 is controlled based on the motion program 41. The laser oscillator 7 includes a light source that oscillates a laser beam. The light source of the present embodiment is a semiconductor laser. The laser oscillator 7 may include any light source capable of melting solder.

Figure 9:
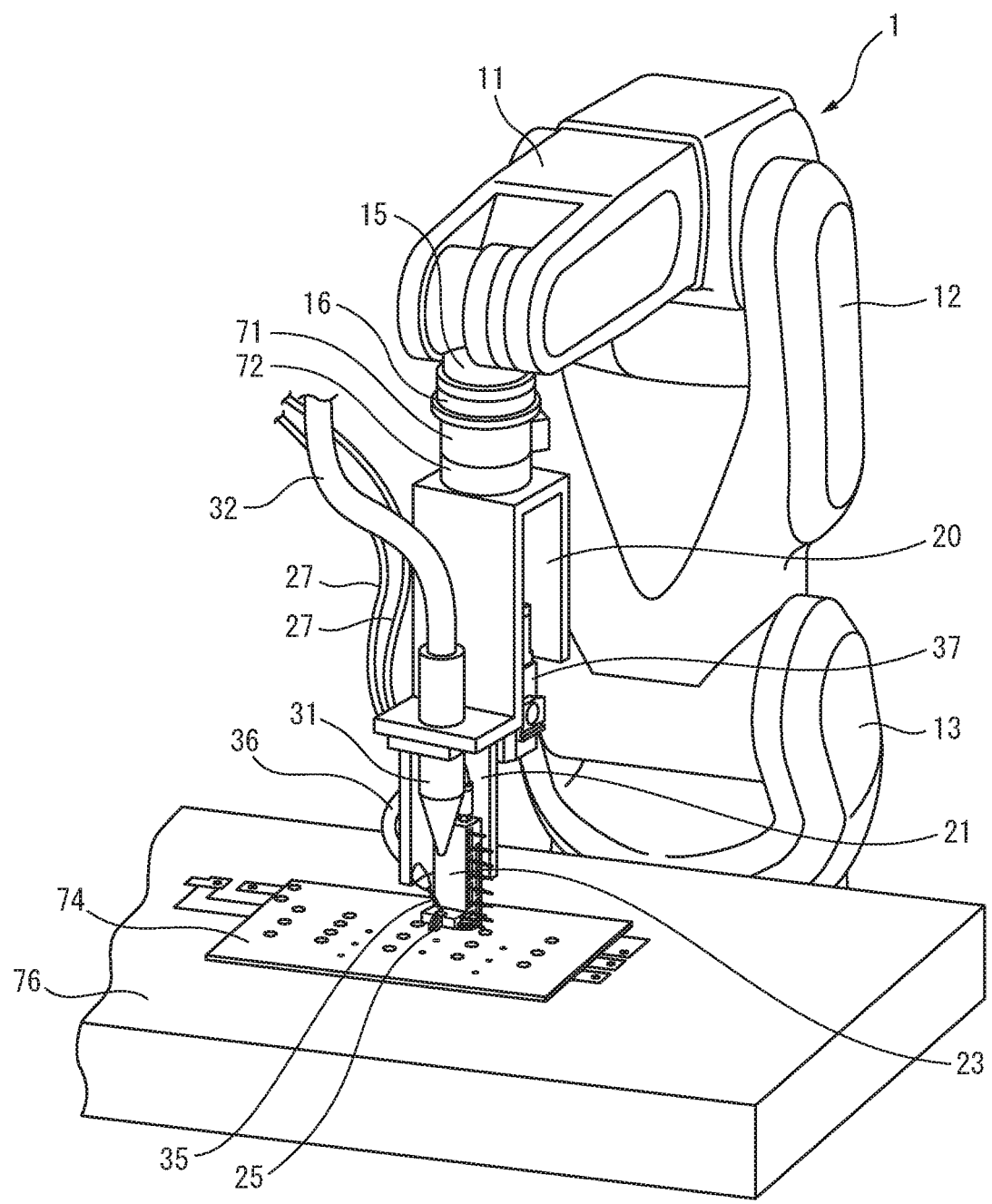
FIG. 9 is a perspective view of the robot apparatus in a first step of soldering.

In the following example, the soldering operation is performed in the robot apparatus according to the present embodiment. FIG. 9 is a perspective view of the robot apparatus in a first step of the soldering operation. Referring to FIGS. 2, 3, 7, 8, and 9, a printed circuit board 74 serving as a workpiece of the present embodiment is fixed to a pedestal 76. In the present embodiment, an electronic part such as a DIP part is fixed to the printed circuit board 74. The soldering device 2 feeds the solder to the back side of the printed circuit board 74.

The controller 4 energizes the heaters 26*a*, 26*b*, and 26*c*. During a soldering period, heating by the heaters 26*a*, 26*b*, and 26*c* is maintained. The solder receiving member 23 and the pouring member 25 are kept at temperatures higher than the melting point of the solder.

Subsequently, a part to be soldered on the printed circuit board 74 is preheated. The controller 4 changes the position and posture of the robot 1. The controller 4 places the soldering device 2 such that the exhaust ports 23*c* of the solder receiving member 23 are opposed to the part to be soldered on the printed circuit board 74. The exhaust ports 23*c* then approach the part to be soldered on the printed circuit board 74.

The controller 4 drives the air feeder 28 so as to feed air into the holes 23*b* of the solder receiving member 23. The high temperature air is ejected from the exhaust ports 23*c* of the solder receiving member 23. The high temperature air then collides with the part to be soldered, thereby heating the part to be soldered.

The soldering device of the present embodiment has the function of preheating the workpiece, but the embodiment is not limited to this. A workpiece may be preheated by other devices. For example, an operation tool for preheating a workpiece can be prepared in advance. An operation tool for preheating may be connected to the robot so as to preheat a workpiece. Alternatively, a workpiece preheated in advance may be placed on the pedestal.

Figure 10:
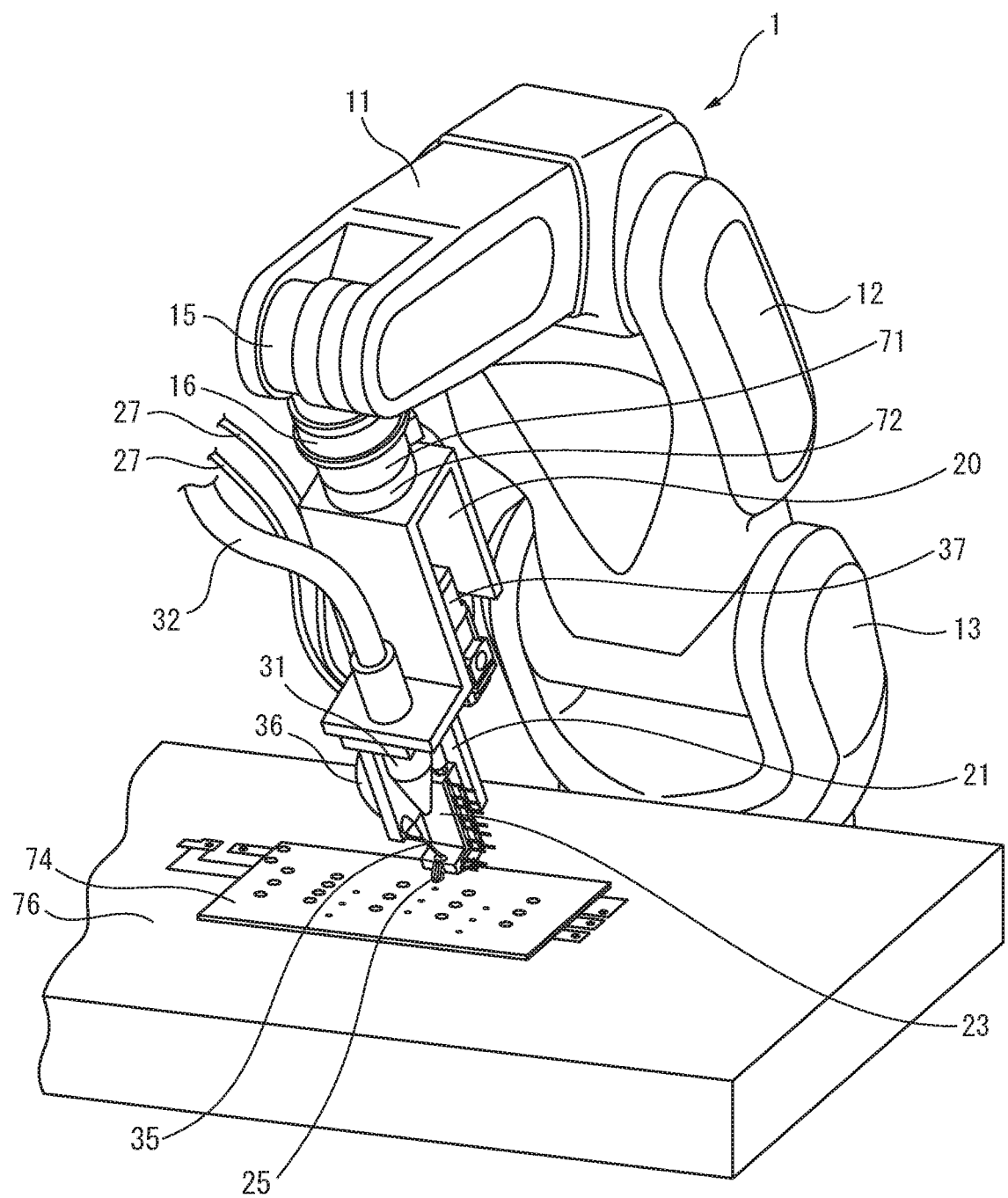
FIG. 10 is a perspective view of the robot apparatus in a second step of soldering.
Figure 11:
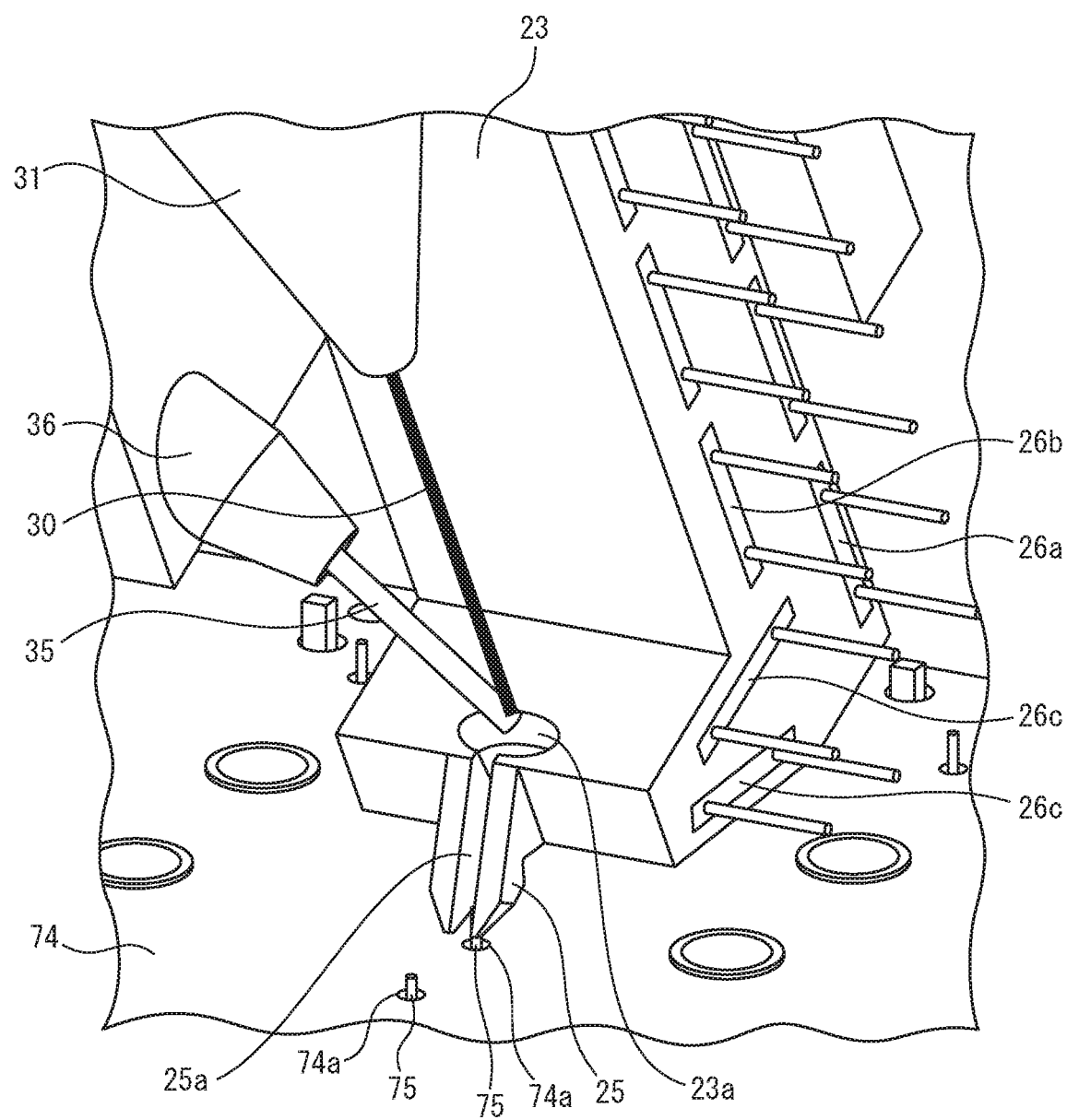
FIG. 11 is an enlarged perspective view of the soldering device when solder is fed to a printed circuit board.

Subsequently, control for feeding the solder to the printed circuit board 74 is performed. FIG. 10 is a perspective view of the robot apparatus in a second step of the soldering operation. FIG. 11 is an enlarged perspective view of the recess part of the solder receiving member and the pouring member during the soldering operation. Referring to FIGS. 10 and 11, in this example, the printed circuit board 74 has through holes 74*a*. Leads 75 of the electronic parts project from the through holes 74*a*. The robot apparatus 5 feeds the molten solder into the through holes 74*a*.

The controller 4 preheats the printed circuit board 74 and then changes the position and posture of the robot 1 based on the motion program 41. The robot 1 tilts the soldering device 2 so that the molten solder flows from the recess part 23*a* to the through hole 74*a* through the groove part 25*a* of the pouring member 25. In the present embodiment, the orientation of the soldering device 2 is changed so as to tilt the bottom surface of the recess part 23*a* with respect to the horizontal direction. In other words, the orientation of the soldering device 2 is changed so as to direct the solder that drops in the recess part 23*a* to the groove part 25*a* by gravitation. Moreover, the soldering device 2 is disposed so as to place the tip of the groove part 25*a* above the through hole 74*a*.

Subsequently, the thread solder 35 is melted by the laser beam 30 while the soldering device 2 is tilted. The controller 4 drives the vibrator 37 in a period during which the laser beam 30 is irradiated and the solder is fed. The laser oscillator 7 oscillates the laser beam 30. The solder feeder 34 feeds a predetermined amount of the thread solder 35 based on the motion program 41. The solder feeder 34 feeds an amount of the solder that corresponds to one soldering operation when the solder is melted by the laser beam 30. In other words, the molten solder is not retained in the recess part 23*a*, but a required amount of solder is melted for each time of the soldering operation immediately before the solder is fed. By adopting this control, the solder is prevented from being left in the recess part 23*a* and oxidized.

When the predetermined amount of the solder is melted, the controller 4 stops the feeding of the thread solder 35 and the oscillation of the laser beam 30. In the solder feeder 34 of the present embodiment, the feed rate of the thread solder 35 is kept constant and thus the thread solder 35 is fed in a predetermined time.

The molten solder drops into the recess part 23*a*. The solder passes through the groove part 25*a* and flows into the through hole 74*a*. The solder is fed to the printed circuit board 74 without being retained in the recess part 23*a*. In the present embodiment, the solder is melted while the soldering device 2 is tilted, so that the molten solder is quickly fed to the printed circuit board 74. This control can suppress the oxidation of the solder during the soldering operation.

In the foregoing embodiment, the solder is melted after the soldering device is tilted. The embodiment is not limited to this. The soldering device may be tilted after the solder is melted. Alternatively, the solder may be fed without tilting the soldering device. For example, the solder may be fed while the soldering device is placed so that the bottom surface of the recess part in the solder receiving member extends in the horizontal direction.

In the soldering device 2 of the present embodiment, the laser beam 30 outputted from the laser head 31 is directed to the solder. When the solder is not fed, the laser beam 30 is directed to the solder receiving member 23. Accordingly, the reflection of a laser beam from the lead of an electronic part is minimized, whereby the board can be prevented from being burned and an electronic part disposed around an electronic part to be soldered can also be prevented from being burned. Furthermore, the laser beam is prevented from traveling in a space between the lead and the through hole of the board, whereby the body of an electronic part can be prevented from being burned.

As described above, the soldering device of the present embodiment can prevent damage to the board or damage to the electronic part. The reliability of the electric circuit formed on a board such as a printed circuit board can be improved. The soldering device of the present embodiment is particularly suitable for manufacturing devices that need to maintain reliability over the long term.

Since the soldering device of the present embodiment can minimize damage to the board or the part fixed to the board, the need for a special board design for soldering with the laser beam is eliminated, and thus the amount of effort required of an operator designing the board can be reduced. For example, the design for a board soldered without a laser beam can be used without changing the basic design. In other words, a board in the related art can be used without changing the basic design.

Figure 12:
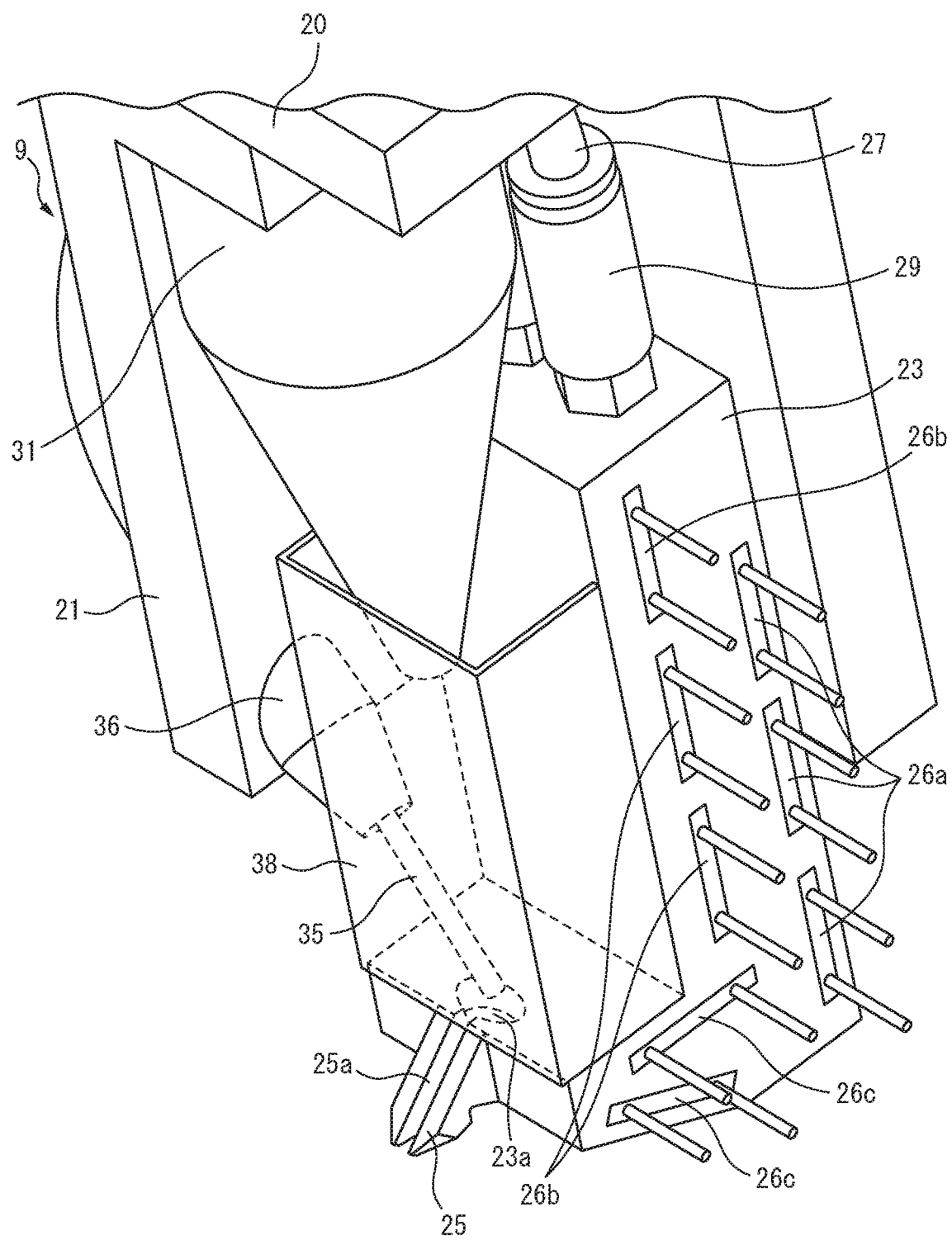
FIG. 12 is an enlarged perspective view of the soldering device according to a modification.

FIG. 12 is an enlarged perspective view of another soldering device according to the present embodiment. Another soldering device 9 of the present embodiment includes a wall member 38 surrounding the laser beam 30 outputted from the laser head 31.

The wall member 38 can be formed so as to surround a part where the laser beam 30 collides with the thread solder 35. The wall member 38 can be made of a heat-resistant material having a higher melting point than the solder. For example, the wall member 38 can be made of a fine ceramic, a metal, a resin having a higher melting point than the solder, or the like. By adopting this configuration, the wall member 38 acts as a dispersion preventing wall for preventing the molten solder from dispersing out of the soldering device 9.

When the laser beam 30 is irradiated to the solder, a phenomenon in which small solder particles disperse may occur. In other words, spattering may occur, especially when the laser beam 30 rapidly raises the temperature of the solder. Short-circuiting may occur in the electric circuit formed on the board by the dispersion of the solder particles. For example, if the solder particles adhere to a board on which leads or through holes are placed with small pitches, an electric circuit may be short-circuited.

The dispersion of the solder due to spattering can be prevented by arranging the wall member 38 acting as a dispersion preventing wall. Moreover, when the solder rises in temperature, flux included in the solder may be broken and dispersed. A dispersion preventing wall can prevent the dispersion of flux.

The wall member 38 of the present embodiment can be formed so as to surround a part where the laser beam 30 reaches the solder receiving member 23. In the present embodiment, the wall member 38 is formed so as to surround the recess part 23a of the solder receiving member 23. The wall member 38 can be made of material that prevents the transmission of the laser beam 30. For example, the wall member 38 can be made of a metal or a fine ceramic. By adopting this configuration, the wall member 38 acts as a laser beam barrier wall for preventing the laser beam 30 reflected on the solder receiving member 23 from leaking out of the soldering device 9.

The laser beam 30 outputted from the laser head 31 may reach the solder receiving member 23. For example, when the feeding of the thread solder 35 is terminated, the laser beam 30 may reach the recess part 23a. The laser beam 30 may be then reflected on the surface of the solder receiving member 23 and leak out of the soldering device 2. The laser beam having leaked out of the soldering device 2 may reach a member such as the board or the electronic part, and burn the member. By arranging a wall member 38 which prevents transmission of the laser beam 30, the laser beam 30 is prevented from reaching a member such as the board or the electronic part after reflection.

The wall member 38 of the present embodiment surrounds the entire outputted laser beam 30. Moreover, the wall member 38 is formed around a region from the part in which the recess part 23a is formed to the tip of the laser head 31. Furthermore, the wall member 38 is made of heat-resistant material that prevents the transmission of the laser beam. Thus, the wall member 38 of the present embodiment acts as the dispersion preventing wall and the laser beam barrier wall.

In the robot apparatus of the present embodiment, the soldering device is supported by the articulated robot. The robot apparatus can perform the soldering operation using the soldering device in various orientations at various positions. For example, the soldering operation can be performed while avoiding a specific part. Alternatively, the solder can be fed from various angles during the soldering operation. Thus, by using the articulated robot as a device for moving the soldering device, various parts can be soldered.

FIG. 13 is a schematic side view of a soldering system including the soldering device of the present embodiment. In the above embodiment, the soldering device is supported by the articulated robot. The configuration is not limited to this embodiment. The soldering device can be placed in various devices or systems.

A soldering system 8 includes a bed 51 serving as a pedestal and a column 52 raised from the bed 51. On the top surface of the bed 51, an X-axis guide rail 56 extending in the X-axis direction is disposed. On the X-axis guide rail 56, a saddle 53 is disposed. The saddle 53 is formed so as to move along the X-axis guide rail 56 as indicated by an arrow 95. On the top surface of the saddle 53, Y-axis guide rails 57 extending in the Y-axis direction are disposed. On the Y-axis guide rails 57, a table 54 is disposed. The table 54 is formed so as to move along the Y-axis guide rails 57. The printed circuit board 74 as a workpiece is fixed to the table 54 via a board holder 77.

The column 52 has a Z-axis guide rail 58 extending in the Z-axis direction. A movement member 59 is engaged with the Z-axis guide rail 58. The soldering device 2 is fixed to the movement member 59. The movement member 59 is formed so as to move along the Z-axis guide rail 58 as indicated by an arrow 96.

The soldering system 8 of the present embodiment is a numerically controlled system. The soldering system 8 includes a movement device that moves at least one of the soldering device 2 and the printed circuit board 74 along a feed axis. The soldering system 8 includes a controller 6 that controls the soldering system 8. The controller 6 controls the movement device. The controller 6 includes an arithmetic processing device (computer) including a CPU as a processor, RAM, and the like. The movement device includes a motor disposed for each feed axis. In the soldering system 8 of the present embodiment, the movement member 59, the saddle 53, and the table 54 are moved by the motors. The controller 6 drives the motor corresponding to the feed axis based on the motion program.

The soldering system 8 includes the laser oscillator 7 that oscillates a laser beam. The laser beam oscillated by the laser oscillator 7 is fed to the soldering device 2 through the optical fiber 32. The laser oscillator 7 includes a laser controller that includes an arithmetic processing device (computer) having a CPU as a processor. The laser controller and the soldering device 2 are controlled by the controller 6.

In the soldering system 8 of the present embodiment, the position of the soldering device 2 can be changed relative to the printed circuit board 74. The controller 6 moves the printed circuit board 74 in the X-axis direction and the Y-axis direction such that a part to be soldered on the printed circuit board 74 is placed at a predetermined position based on the motion program. Moreover, the controller 6 moves the movement member 59 in the Z-axis direction so as to place the soldering device 2 at a predetermined distance from the printed circuit board 74.

In this way, the soldering device 2 is moved relative to the printed circuit board 74, so that various parts on the printed circuit board 74 can be preheated and the solder can be fed to the parts.

The soldering system 8 does not include a mechanism for tilting the soldering device 2. The embodiment is not limited to this. The soldering system 8 may have a mechanism for tilting the soldering device 2. For example, the movement member 59 may include a mechanism for rotating the soldering device 2.

In the soldering system 8, the printed circuit board 74 is moved in the X-axis direction and the Y-axis direction, whereas the soldering device 2 is moved in the Z-axis direction. The embodiment is not limited to this. The position of the soldering device can be changed relative to a workpiece by any mechanism.

In the present embodiment, the soldering operation is performed in order to fix the electronic part to the printed circuit board, but the embodiment is not limited to this. The soldering device of the present embodiment is applicable to any device for feeding the molten solder to a workpiece. For example, the soldering device of the present embodiment is applicable to a device for connecting conductive wires by the solder.

An aspect of the present disclosure can provide the soldering device that suppresses damage caused by a laser beam to a workpiece or a part fixed to the workpiece, and the robot apparatus including the soldering device.

The foregoing embodiment can be optionally combined with another. In the drawings, the same or equivalent parts are indicated by the same reference numerals. The foregoing embodiment is merely exemplary and does not limit the invention. The embodiments include the modifications described in the claims.

The invention claimed is:

1. A soldering device for feeding solder melted by a laser beam to a workpiece, comprising:
   a laser beam emitting member for outputting the laser beam;
   a solder feeder for feeding the solder to a path of the laser beam;
   a solder receiving member for receiving the solder melted by the laser beam; and
   a pouring member for pouring molten solder into the workpiece; wherein
   the solder receiving member includes a reception part having a shape for retaining the molten solder, and
   the pouring member is fixed to the solder receiving member and has a solder channel communicating with the reception part and allowing the solder to flow therein.

2. The soldering device according to claim 1, further comprising a heater mounted in the solder receiving member,
   the heater is formed so as to keep temperatures of the solder receiving member and the pouring member higher than a melting point of the solder.

3. The soldering device according to claim 2, further comprising an air feeder for feeding air to the solder receiving member, wherein
   the solder receiving member includes an air passage connected to the air feeder and an exhaust port formed on one end of the air passage, and is formed so as to eject heated air.

4. The soldering device according to claim 1, further comprising a dispersion preventing wall for preventing the molten solder from dispersing out of the soldering device, wherein
   the dispersion preventing wall is formed so as to surround a part where the laser beam collides with the solder, and is made of a material having a higher melting point than the solder.

5. The soldering device according to claim 1, further comprising a laser beam barrier wall for preventing the laser beam reflected on the solder receiving member from leaking out of the soldering device, wherein
   the laser beam barrier wall is formed so as to surround a part where the laser beam reaches the solder receiving member, and is made of a material that prevents transmission of the laser beam.

6. The soldering device according to claim 1, further comprising a vibrator for vibrating the solder receiving member, wherein
   the vibrator vibrates the solder receiving member when the solder is fed to the workpiece.

7. The soldering device according to claim 1, wherein the solder feeder feeds an amount of solder corresponding to one soldering operation when the solder is melted by the laser beam.

8. A robot apparatus comprising:
   the soldering device according to claim 1;
   an articulated robot for changing a position and orientation of the soldering device; and
   a controller for controlling the articulated robot; wherein
   the controller performs control in which the soldering device is tilted so as to feed the molten solder from the reception part to the workpiece through the solder channel, and control in which the laser beam is irradiated in order to feed the solder to the workpiece while the soldering device is tilted.

* * * * *